United States Patent [19]

Mitchell

[11] 4,187,495
[45] Feb. 5, 1980

[54] LOW TIRE PRESSURE WARNING SYSTEM

[76] Inventor: Walter A. Mitchell, P.O. Box 126, Redway, Calif. 95560

[21] Appl. No.: 881,720

[22] Filed: Feb. 27, 1978

[51] Int. Cl.² .......................................... B60C 23/06
[52] U.S. Cl. ................................ 340/58; 200/61.23; 200/61.24
[58] Field of Search ............ 340/58; 200/61.22, 61.23, 200/61.24

[56] References Cited

U.S. PATENT DOCUMENTS

| | | | |
|---|---|---|---|
| 3,096,410 | 7/1963 | Anderson | 200/61.24 |
| 3,223,970 | 12/1965 | Lowery | 340/58 |

*Primary Examiner*—Alvin H. Waring
*Attorney, Agent, or Firm*—Clarence A. O'Brien; Harvey B. Jacobson

[57] ABSTRACT

A mounting plate is provided to extend along beneath and to be secured to one end of a transverse axle adjacent a pneumatic tire journaled from the axle end and the plate includes structure whereby different size U-bolts may be utilized in conjunction therewith for clamping the plate to the underside of axle housings of different diameters. An actuating switch is provided and is mounted from the plate for adjustable positioning laterally of the associated axle housing and the switch includes a depending 360 degree wobble actuator for contact with the ground closely adjacent the point of contact of the tire with the ground or contact with the adjacent side wall portion of the tire when the latter becomes deflated. The switch is serially connected in a circuit in which a source of electrical potential is also serially connected and electrical signal generating structure is also serially connected in the circuit with the actuating switch being normally open and closable upon the wobble actuator thereof being laterally deflected adjacent the lower end thereof beyond a predetermined extent.

9 Claims, 7 Drawing Figures

U.S. Patent  Feb. 5, 1980  Sheet 1 of 2  4,187,495
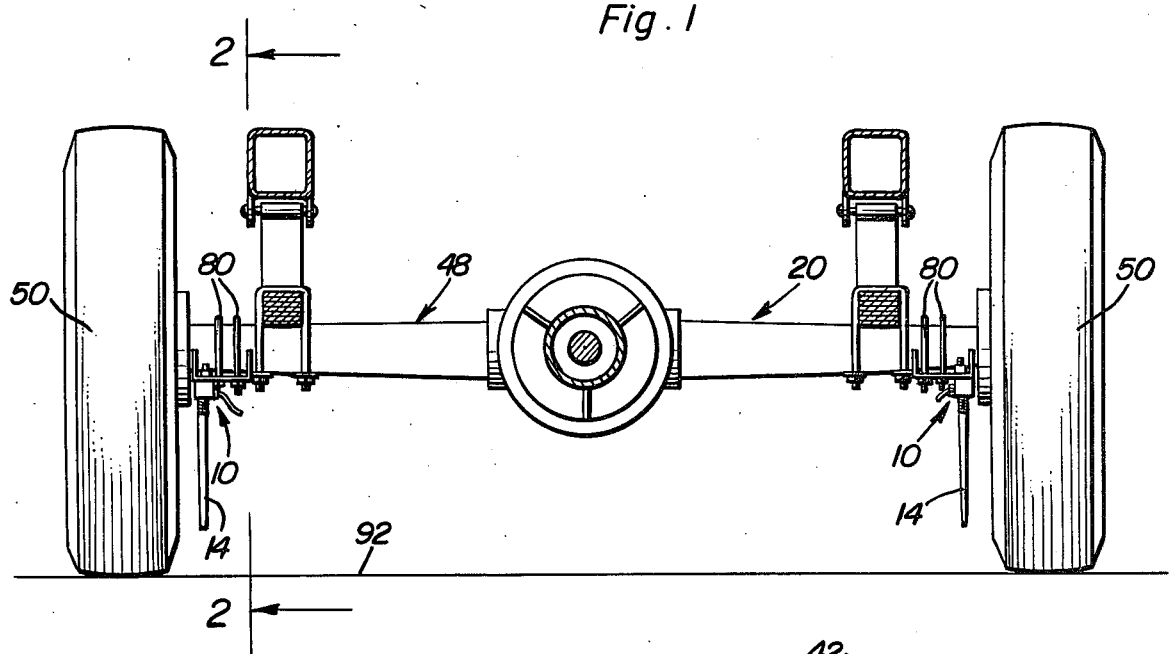
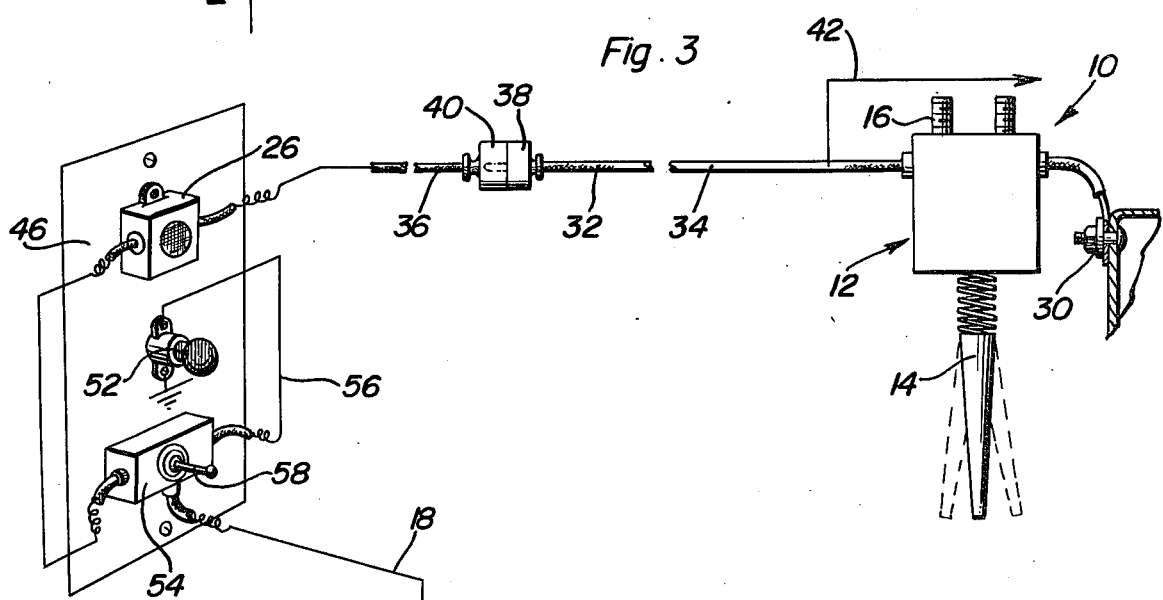
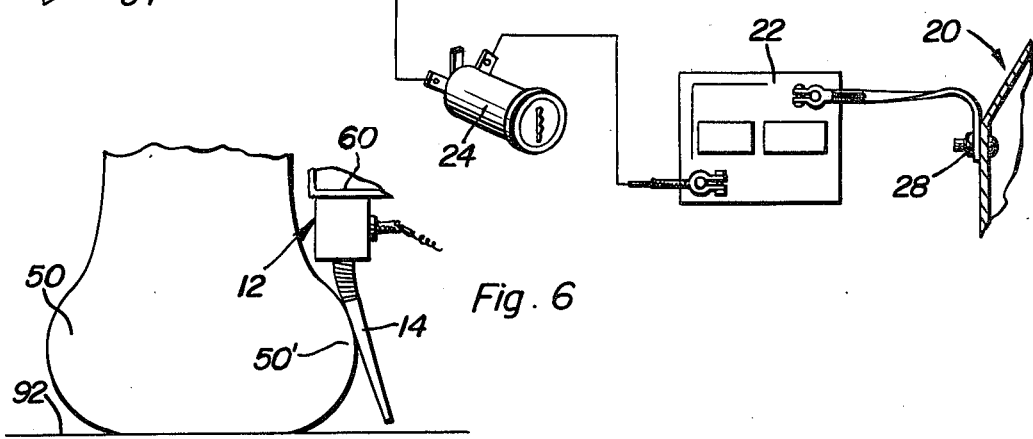

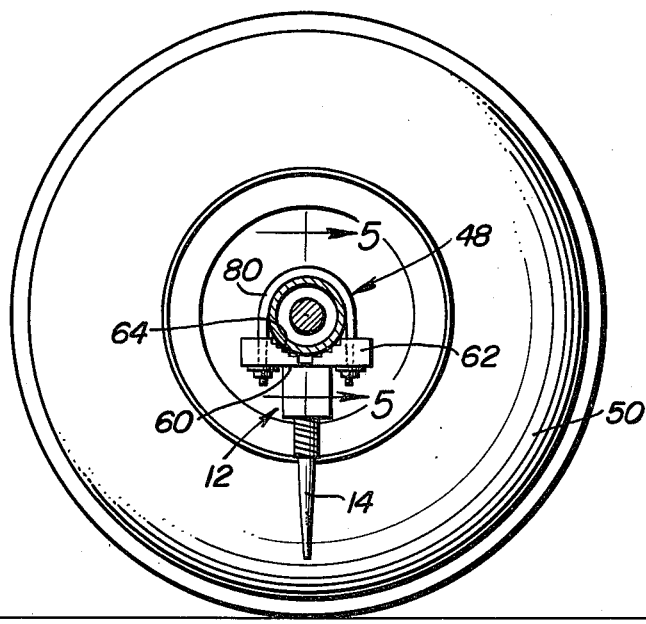
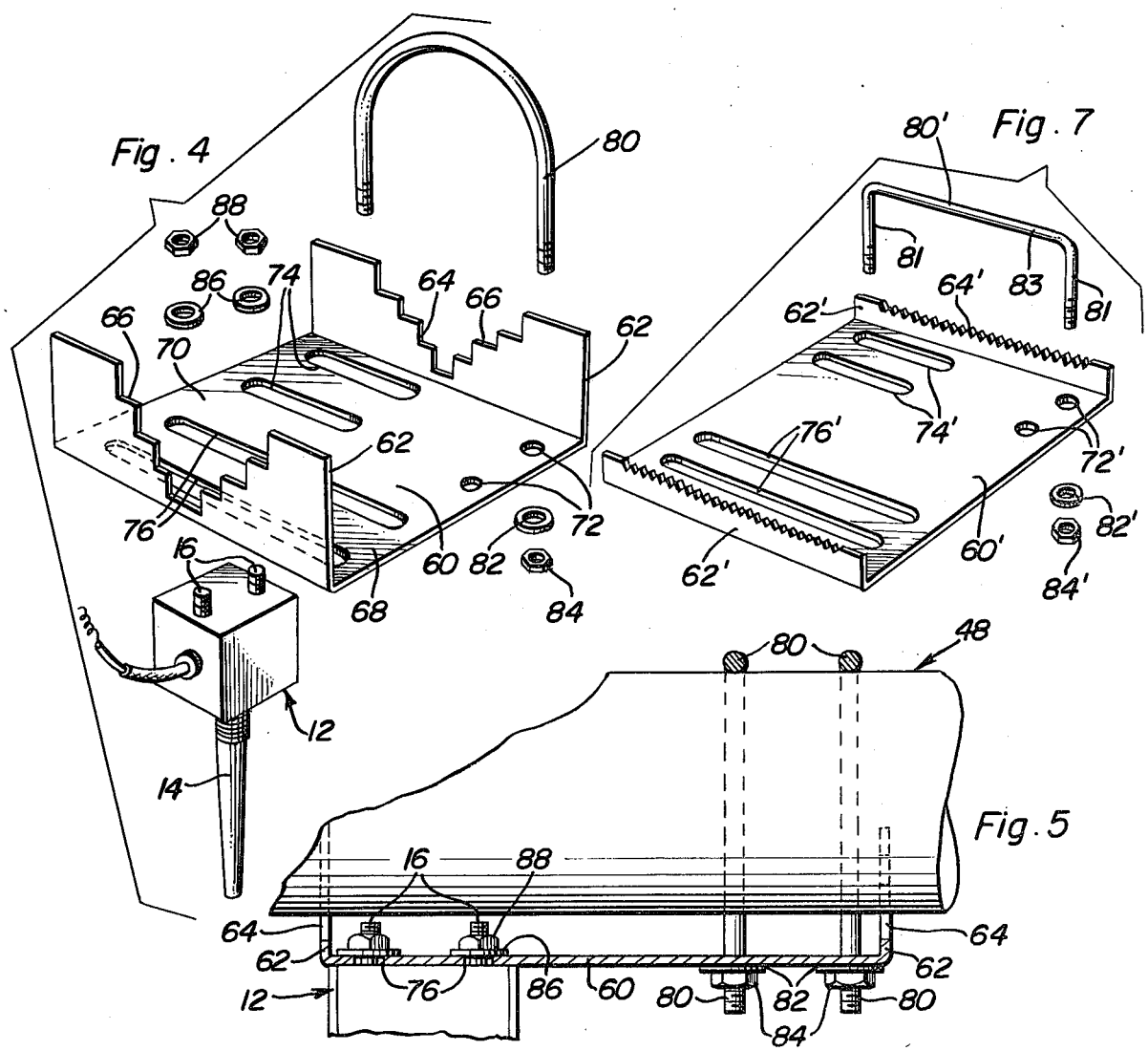

LOW TIRE PRESSURE WARNING SYSTEM

BACKGROUND OF THE INVENTION

Various forms of pneumatic tire equipped vehicles can be operated with one of the pneumatic tires thereof in a deflated position without the driver of the vehicles being aware of the deflated tire condition. Of course, operation of a deflated tire for more than short distances causes the tire to be excessively flexed and to generate considerable quantities of heat due to the excessive flexing. This excessive flexing and heat can quickly render the tire irreparably damaged. Accordingly, a need exists for a low tire pressure warning system which may be readily mounted on various forms of vehicles and utilized to indicate to the driver of a vehicle when one of the pneumatic tires thereof or the pneumatic tires of a trailer vehicle being towed therebehind has become deflated.

Various forms of low tire pressure warning systems have been heretofore designed, but most of these systems are not constructed in a manner whereby they may be readily mounted upon different vehicles equipped with different types and sizes of axles.

Examples of various forms of previously known low tire pressure warning systems are disclosed in U.S. Pat. Nos. 2,258,334, 2,469,931, 2,640,119, 2,740,007 and 3,610,851.

BRIEF DESCRIPTION OF THE INVENTION

The low tire pressure warning system of the instant invention includes a plate-type mount for securement beneath one end portion of an axle from which a wheel having a pneumatic tire thereon is journaled. An actuating switch for a low tire pressure alarm circuit is dependingly supported from the mounting plate and includes a depending 360 degree wobble actuator for contact with the ground closely adjacent the point of contact of the associated tire with the ground or contact with the adjacent side wall portion of the tire when the latter becomes deflated and the side wall bulges laterally outwardly adjacent the point of contact of the tire with the ground. The mounting bracket or plate is constructed in a manner whereby it may be utilized in conjunction with U-bolts of different sizes and configurations for clampingly securing the mounting plate to the undersides of different types and sizes of axle housings and the mounting plate further includes structure whereby the actuating switch supported therefrom may be adjustably positioned laterally of the associated axle housing to a position with the depending 360 degree wobble actuator thereof properly positioned relative to the associated tire.

The main object of this invention is to provide a low tire pressure warning system which may be readily utilized in conjunction with various forms of vehicles and vehicles including different sizes and types of axle housings.

Another object of this invention is to provide a low tire pressure warning system including an audible signal generator actuatable in response to the sensing of low tire pressure and further including a switch for terminating operation of the audible signal generator but at the same time actuating a visual signal to indicate that the electrical circuitry of the system has been switched out of the audible signal generating mode.

Another important object of this invention is to provide a low tire pressure warning system which may be utilized on operator driven vehicles as well as vehicles trailed behind operator driven vehicles.

Another important object of this invention is to provide a system in accordance with the preceding objects and which may be readily adapted for use in conjunction with vehicles having different size tires.

A further object of this invention is to provide a low tire pressure warning system which may be readily operatively mounted on various forms of vehicles after their manufacture.

A final object of this invention to be specifically enumerated herein is to provide a low tire pressure warning system in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, vertical, sectional view of a vehicle equipped with a low tire pressure warning system constructed in accordance with the instant invention;

FIG. 2 is an enlarged, vertical, sectional view taken substantially upon the plane designated by the section line 2—2 of FIG. 1;

FIG. 3 is a schematic view of the operating components of the system;

FIG. 4 is an exploded, perspective view of one form of axle mounting plate which may be used in the system;

FIG. 5 is an enlarged, fragmentary, vertical, sectional view taken substantially upon the plane designated by the section line 5—5 of FIG. 2;

FIG. 6 is a fragmentary, elevational view illustrating the manner in which the actuating switch of the system is actuated by a partially deflated tire; and FIG. 7 is a perspective view of a second form of axle mounting plate which may be used in conjunction with axles which are generally rectangular in cross-sectional shape.

DESCRIPTION OF THE PREFERRED EMBODIMENTS

Referring now more specifically to the drawings, the numeral 10 generally designates a low tire pressure warning system constructed in accordance with the present invention. The system 10 includes at least one actuating switch assembly referred to in general by the reference numeral 12 including a depending 360 degree wobble switch actuator 14. The switch assembly 12 may be a microswitch, model No. LSJIA-7A manufactured by the Honeywell Corporation. The switch assembly 12 includes a pair of upwardly projecting threaded mounting studs 16 for a purpose to be hereinafter more fully set forth.

The warning system 10 includes an electrical circuit 18 of a vehicle referred to in general by the reference numeral 20 and the circuit 18 has a battery 22, ignition switch 24 and audible signal generator 26 as well as the actuating switch assembly 12 serially connected therein, the battery 22 being grounded to the vehicle as at 28 and the actuating switch assembly 12 being grounded to the vehicle as at 30.

The circuit 18 includes a portion 32 extending between the signal generator 26 and the actuating switch assembly 12 comprising a pair of conductors 34 and 36 including releasably engageable male and female plug connectors 38 and 40. In addition, the circuit 18 includes one or more branch circuits 42 connected in parallel therewith and in which additional actuating switch assemblies 12 (operatively associated with other tires of the vehicle 20) may be serially connected and grounded to the vehicle 20.

The audible signal generator 26 is mounted on a plate 46 adapted to be mounted in the operator's compartment of the vehicle 20 and from FIG. 1 of the drawings it may be seen that the vehicle 20 includes a transverse axle assembly referred to in general by the reference numeral 48 from whose opposite ends a pair of wheel mounted pneumatic tires 50 are journaled.

The plate 46 also has a visual signal generator 52 mounted thereon and grounded to the vehicle 20 through the plate 46 and also a control switch 54 serially connected in the circuit 18 and controlling a bypass circuit 56 between the switch 54 and the visual signal generator 52. When the actuator 58 of the switch 54 is in one position, the circuit 18 is uninterrupted and when the actuator 58 is in the other position, the circuit 18 is interrupted between the ignition switch 24 and the audible signal generator 26 at the switch 54 and the bypass circuit 56 is serially connected therein. Accordingly, when the actuator 58 is in the first position thereof and the switch assembly 12 is in the closed position, the audible signal generator 26 will be actuated. However, when the actuator 58 of the switch 54 is shifted to its second position, operation of the audible signal generator 26 is terminated and the visual signal generator 52 is electrically actuated.

Referring now more specifically to FIGS. 2 through 5 of the drawings, there may be seen a mounting plate 60 which may be clamped to a corresponding end of the axle housing 48. The mounting plate 60 includes a pair of opposite end upstanding flanges 62 defining aligned upwardly opening V-shaped notches 64 whose opposite sides are stepped as at 66. The plate 60 includes opposite side marginal portions 68 and 70 extending lengthwise of the plate 60 between the end flanges 62 and one end of the marginal portion 68 has a pair of apertures 72 formed therethrough with which a pair of longitudinally spaced transverse slots 74 formed in the marginal portion 70 are formed. In addition, the end of the plate 68 remote from the apertures 72 and the slots 74 is provided with a pair of long transverse slots 76.

The mounting plate 60 is positionable beneath either end of the axle housing 48 with the lower peripheral portion of the axle housing 48 seated in the notches 64. A pair of inverted U-bolts 80 have one pair of corresponding ends secured through the apertures 72 by means of washers and nuts 82 and 84 and the other pair of ends of the U-bolts 80 are secured through the slots 74 by means of corresponding washers and nuts 82 and 84. The slots 74 enable U-bolts of different widths to be utilized in conjunction with the mounting bracket 60, according to the diameter of the associated axle housing 48.

The threaded mounting studs 16 of the actuating switch assembly 12 are secured upwardly through the slots 76 by means of washers 86 and nuts 88 and it may, therefore, be appreciated that the actuating switch assembly 12 may be shifted transversely of the mounting plate 60 and secured in adjusted position according to the desired positioning of the 360 degree wobble switch actuator 14 relative to the associated pneumatic tire 50.

With attention now invited more specifically to FIG. 7 of the drawings, there may be seen a modified form of mounting plate 60' which is similar in many respects to the mounting plate 60 and which, therefore, has corresponding components thereof referred to by corresponding prime reference numerals.

The mounting plate 60' differs from the mounting plate 60 in that the end flanges 62' thereof include upper horizontal serrated edges 64' in lieu of the stepped V-shaped notches 64 of the mounting plate 60. Of course, the mounting plate 60 is adapted to be utilized in conjunction with axle housings of generally cylindrical cross-sectional shape and the mounting plate 60' is adapted to be utilized in conjunction with axles or axle housings of generally rectangular cross section. Also, instead of utilizing curved U-bolts 80, the mounting plate 60' utilizes U-bolts 80' including legs 81 disposed at substantially right angles relative to the bight portions 83 thereof extending between corresponding ends of the legs 81.

With attention now invited more specifically to FIG. 6, it may be seen that a low pneumatic tire 50 bulges out at its lower peripheral portion as at 50' and contacts and deflects the 360 degree wobble actuator 14 in order to close the normally open actuating switch assembly 12. When the actuating switch assembly 12 is closed and the actuator 58 for the switch 54 is in the first position thereof, the circuit 18 is closed and the audible signal generator 26 is actuated. Whenever the audible signal generator 26 is actuated, the driver of the vehicle 20 may stop the vehicle, switch the actuator 58 of the switch 54 to the second position thereof thereby terminating operation of the audible signal generator 26 and initiating operation of the visual signal generator 52. In this manner, the operator of the vehicle 10 may dismount from the vehicle 20 to inspect his tires and he will be reminded that the switch actuator 58 has been moved to the second position thereof by the red visual signal generator 52 when he returns to his cab.

Of course, the mounting plates 60 and 60' enable shifting of the plates longitudinally of the associated axle housing to properly position the 360 degree wobble actuator 14 for the switch 12 in proper spaced relation relative to the inside of the associated tire 50. Also, the switch actuator 12 may be shifted transversely of either the mounting plate 60 or the mounting plate 60' to further obtain the desired positioning of the wobble actuator 14 relative to the associated tire.

If the actuating switch assembly 12 is supported from a trailer, the conductor 32 may extend between the towing vehicle and the trailer and thus the plugs 38 and 40 may be disconnected whenever it is desired to disconnect the trailer from the towing vehicle. Further, the 360 degree wobble switch actuator 14 may be constructed of different lengths to adapt the system to be used in conjunction with vehicles equipped with different diameter tires. Also, the wobble switch actuator 14 is capable of closing the switch assembly 12 when the lower end of the actuator engages and is deflected by the surface 92 upon which the tires 50 rest.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A low tire pressure warning system for vehicles equipped with pneumatic tires, said system including at least one actuating switch for support from a portion of a vehicle from which a wheel thereof equipped with a pneumatic tire is journaled, said switch including a depending 360 degree wobble actuator for contact with the ground closely adjacent the point of contact of said tire with the ground or contact with the adjacent side wall portion of said tire when the latter becomes deflated and the side wall bulges laterally outwardly adjacent the point of contact of the tire with the ground, said switch being serially connected in a main circuit in which a source of electrical potential is also serially connected, and first electrical audible signal generating means also serially connected in said circuit, said actuating switch being normally open and being closable upon said wobble actuator being laterally deflected adjacent its lower end beyond a predetermined extent, said circuit including bypass circuit, in which said source is serially connected, connected in parallel with the first mentioned circuit and bypassing said signal generating means and said switch, said bypass circuit including second electrical visual signal generating means serially connected therein, and control switch means including control means for selectively bypassing that portion of said main circuit in which said audible signal generating means is serially connected and actuating said bypass circuit in which said visual signal generating means is serially connected or bypassing said bypass circuit and actuating that portion of said main circuit in which said audible signal generating means is serially connected.

2. The combination of claim 1 wherein the portion of the main circuit which may be bypassed by said bypass circuit includes a plurality of said wheel switches connected in parallel therein.

3. The combination of claim 2 including vehicle means from which said system is supported, said vehicle means including a plurality of wheels equipped with pneumatic tires to be monitored, said system including a toggle actuator equipped switch operatively associated with each of said tires.

4. The combination of claim 3 wherein said vehicle means includes a towing vehicle and a towed vehicle, said pneumatic tires to be monitored including the tires of said towed vehicle, said towing vehicle including an operator's area, said signal generating means being disposed in said operator's area.

5. The combination of claim 3 wherein at least one of said wheels is journalled from one end of an elongated axle member, a mounting plate, said mounting plate including a longitudinal dimension and a transverse dimension and extending lengthwise beneath and upwardly abutted against one end portion of said axle member, said plate including transverse slot means at one end for mounting said actuating switch in depending relation therefrom by fastener means secured through said slot means and adjustably positionable along said slot means, the other end portion of said plate including longitudinally spaced openings formed therethrough adjacent one side of said plate and a pair of longitudinally spaced transverse slots formed therethrough adjacent the other side of said plate and aligned with said openings, a pair of U-bolts each including a pair of legs, said openings and the corresponding slots slidably receiving said legs therethrough with said legs embracing the axle member end.

6. The combination of claim 5 wherein said plate includes opposite end transverse abutment means projecting upwardly therefrom frictionally engaged with the underside surfaces of the said axle member.

7. The combination of claim 6 wherein said abutment means include opposite end upturned flanges extending transversely of said plate, the upper edges of said flanges being actuated.

8. The combination of claim 6 wherein said abutment means includes opposite end upturned flanges extending transversely of said plate, said flanges having aligned upwardly opening notches formed therein.

9. The combination of claim 8 wherein said notches are generally V-shaped and include stepped opposite side portions.

* * * * *